Figure 1:
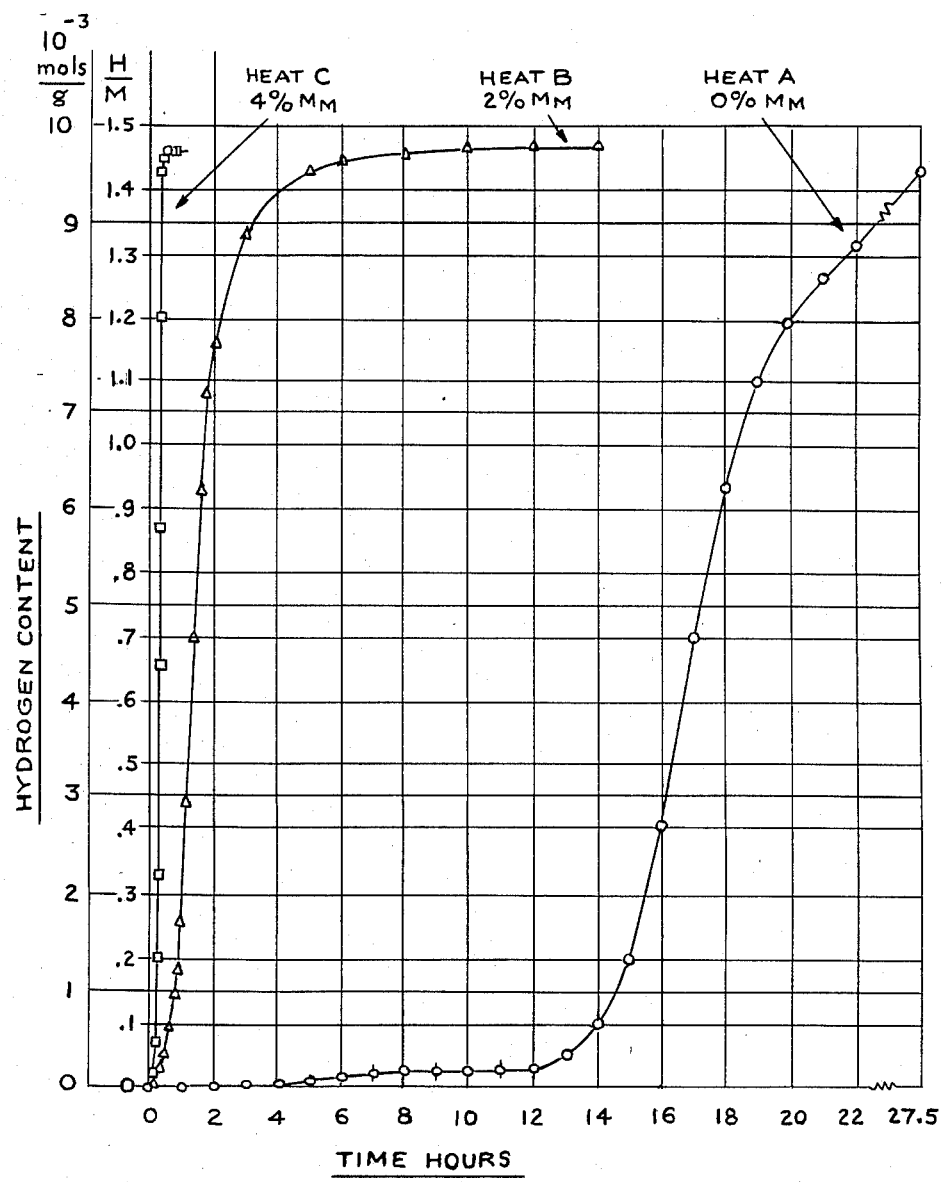

United States Patent [19]

Sandrock

[11] Patent Number: 4,668,424
[45] Date of Patent: May 26, 1987

[54] LOW TEMPERATURE REUSABLE HYDROGEN GETTER

[75] Inventor: Gary D. Sandrock, Ringwood, N.J.

[73] Assignee: Ergenics, Inc., Wyckoff, N.J.

[21] Appl. No.: 841,432

[22] Filed: Mar. 19, 1986

[51] Int. Cl.$^4$ .......................... H01K 1/56; H01J 7/18; H01J 35/20; C22C 16/00

[52] U.S. Cl. .................................. 252/181.3; 420/422; 420/423; 420/900; 423/248; 252/188.25

[58] Field of Search .................. 252/181.3, 188.25; 420/422, 423, 900; 423/248

[56] References Cited

U.S. PATENT DOCUMENTS

| | | | |
|---|---|---|---|
| 4,079,523 | 3/1978 | Sandrock | 420/900 X |
| 4,113,478 | 9/1978 | Tanner et al. | 420/422 X |
| 4,163,666 | 8/1979 | Shaltier et al. | 252/188.25 X |
| 4,200,460 | 4/1980 | Grossman et al. | 420/422 |
| 4,242,315 | 12/1980 | Bruning et al. | 423/645 X |
| 4,406,874 | 9/1983 | Wallace et al. | 420/900 X |
| 4,421,718 | 12/1983 | Osumi et al. | 420/900 X |
| 4,431,561 | 2/1984 | Ovshinsky et al. | 252/188.25 X |

*Primary Examiner*—John F. Terapane
*Assistant Examiner*—Matthew A. Thexton
*Attorney, Agent, or Firm*—Charles E. Baxley

[57] ABSTRACT

Hydrogen gettering alloys which contain nickel, mischmetal, and zirconium, and may optionally contain one or more of cobalt, copper, iron, aluminum, tin, titanium and silicon, overcome many of the deficiencies of the existing getter technology. These alloys may be readily activated for use and regenerated for reuse. They are conveniently prepared using available furnace technology.

10 Claims, 4 Drawing Figures

LOW TEMPERATURE REUSABLE HYDROGEN GETTER

This invention relates to metallic compositions for gettering hydrogen. It particularly relates to non-evaporable alloys for gettering hydrogen at low temperatures and to processes for preparing said alloys, improving their gettering capacity, and regenerating them.

BACKGROUND OF THE INVENTION

There are numerous devices and processes where the presence of hydrogen is undesirable. One example is the insulated-anulus steel tubing that is used for steam injection for secondary oil recovery. It is desired, for thermal insulation purposes, that the anulus consist of either a vacuum or an inert gas such as argon. Hydrogen can enter the insulating anulus as a result of outgasing from the steel or external corrosion processes, thus decreasing the insulating ability of the anulus. Another example is the ammonia heat pipe which can suffer impaired operation from the buildup of hydrogen resulting from internal corrosion processes. Another series of examples are numerous inert gas chambers, such as "dryboxes", which are used widely in laboratories and industry. These chambers may, at times, be undesirably contaminated with hydrogen or the heavy isotopes deuterium and tritium. Yet another example is the separation of small amounts of hydrogen from helium during the commercial isolation of helium. There are numerous other examples where it is desirable to getter hydrogen or its isotopes from vacuum chambers or various gasses.

Numerous examples of the use of hydrogen getters can be found but each has certain disadvantages. Titanium metal has been used but it must be heated to at least 600° C. to render it active to hydrogen absorption and can easily be de-activated by the presence of gaseous impurities such as oxygen or water. Furthermore, once saturated with hydrogen, titanium must be heated to the order of 600° C. under vacuum to remove the hydrogen and make it capable of reuse.

Another hydrogen getter that has often been used is depleted uranium metal. One disadvantage of uranium is that it forms a fine power upon hydriding, usually rendering it potentially pyrophoric upon exposure to air. A further disadvantage of uranium, even in the U-235 depleted form, is the fact that it is mildly radioactive, requiring special handling and disposal.

A series of zirconium-based getters are sold commercially by SAES Getters of Milan, Italy. These consist of at least 70% by weight of zirconium, with the balance consisting of elements such as aluminum, vanadium, iron and nickel. While these commercial getters have been used widely and successfully for hydrogen gettering, they also have a number of undesirable drawbacks. First of all they require temperatures in the range of 200°–900° C. for activation. They will generally not getter hydrogen at room temperature without activation. Second, once activated with hydrogen, they must be heated under vacuum to temperatures on the order of 800° C. to thoroughly remove the hydrogen so that they can be reused as hydrogen getters. Third, because of their high zirconium content, they cannot be melted in readily available air furnaces or common ceramic crucibles but rather must be vacuum arc melted in a water-cooled copper crucible, an inherently more expensive process than air melting in a ceramic crucible.

In the article, "The System Zirconium-Nickel and Hydrogen", by G. G. Libowitz, et al. in Journal of Physical Chemistry, Vol 62 (1958) pp. 76–79, the hydrogen absorption and desorption properties of an intermetallic compound ZrNi (60.8 wt. % Zr—39.2 wt. % Ni) were first described. This compound has attractive properties for many reusable hydrogen getter applications. However, no data below 100° C. was presented and, in fact, this material has undesirable sluggish activation properties at room temperature.

DESCRIPTION OF THE INVENTION

It is, accordingly, an object of this invention to provide hydrogen gettering alloys that are capable of gettering hydrogen to pressures below 0.01 torr at temperatures as low as about 18° to 20° C., i.e., about room temperature.

It is another object of this invention to provide hydrogen gettering alloys which can be readily activated at room temperature and low hydrogen pressures.

It is a further object of this invention to provide hydrogen gettering alloys that can be readily regenerated for reuse.

It is still another object of this invention to provide hydrogen gettering alloys that can be manufactured by conventional air induction melting in a ceramic crucible.

It is yet a further object to provide hydrogen gettering alloys of different compositions to provide means for modifying the absorption/desorption, pressure/temperature relations.

It is yet another object of this invention to provide a surface oxidation treatment for increasing the activity of the hydrogen gettering alloys at low temperatures.

Other objects will appear from the description which follows.

In accordance with this invention there are provided active hydrogen gettering compositions that can be readily and quickly activated at room temperature and also readily and quickly regenerated for reuse. These compositions are comprised in weight percent of: from about 20% to about 45% of nickel, from about 0.1% to about 10% of one or more rare earth metals, and the remainder being zirconium. Preferred compositions contain, in percent by weight, from about 20% to about 40% of nickel, from about 0.1% to about 6% of one or more rare earth metals, and the remainder zirconium. A preferred alloy of this invention contains in percent by weight, 36% of nickel, 4% of one or more rare earth metals, and 60% of zirconium.

In addition, partial substitution of other elements for zirconium and/or nickel can be made up to about 15% by weight. Such elements include cobalt, copper, iron, aluminum, titanium, tin and silicon among many other possibilities. Some of these substitutions modify the gettering temperature/pressure relationships to allow better matching to a given application.

The rare earth metals are those elements present in the lanthanide series of the periodic table. These elements include: lanthanum, cerium, praseodymium, neodymium, promethium, samarium europium, gadolinium, terbium, dysprosium, holmium, erbium, thulium, ytterbium, and lutecium. In addition, calcium and/or yttrium may be substituted for one or more of the rare earth metals. While any one or a combination of two or more of these rare earth metals may be used in the compositions of this invention, in practice I have found it convenient to use alloy compositions containing two or more of these metals. Alloy compositions of this type are known in the art as mischmetals (hereinafter MM) which represent various mixtures of rare-earth elements, each mixture being dependent on the composition of the ore source. A typical MM used in the practice of this invention is derived from a bastnasite ore source consisting by weight of 48-50% Ce, 32-34% La, 13-14% Nd, 4-5% Pr, and about 1.5% other rare-earth metals. This alloy is available under the name Product Code 4601-99% Mischmetal from the Union Molycorp Company. There are other MM compositions where the ratios of rare-earth metals may differ somewhat from those cited above or where minor amounts of iron may be included. The exact MM composition is not critical in the practice of this invention.

The alloys of this invention can be made by melting commercial grade raw materials either in inert atmosphere (or vacuum), cold crucible arc furnaces or in standard air-induction furnaces using clay-graphite crucibles. After solidification, ingots are usually crushed in air to a granular form, say to a range on the order of −10 mesh to +80 mesh, a form that can be directly used for gettering. In some cases it is desirable to give the crushed material a superficial surface oxidation treatment in air at temperatures of from room to 350° C. to increase activity for hydrogen gettering.

If the hydrogen pressure and/or temperature is high enough, granules of getter alloy can be used directly for hydrogen gettering in the intended application. In such case the granular alloy is placed in the device of interest and residual air preferably removed. In those cases where the environmental temperatures are low (e.g. room temperature) and/or the expected hydrogen pressures are low (e.g. less than 50 torr) then it is desirable to pre-activate the getter. This can be done by applying hydrogen at a pressure greater than 0.5 atmosphere absolute at room temperature until the sample becomes saturated with hydrogen, after which a dynamic vacuum or inert gas sweep is applied and the sample is heated to 300°-400° C. to remove the hydrogen. In such an activated condition the getter is capable of removing hydrogen down to levels of less than 0.01 torr at room temperature, so long as it is not subject to significant exposure by air or other corrosive gases such as carbon monoxide, water, hydrogen sulphide and the like. Once saturated with hydrogen during getter service, the alloys can be regenerated by the above mentioned dehydriding procedure.

As one skilled in the art may realize, alloys of this invention are capable of gettering small amounts of other gases in addition to hydrogen, e.g. oxygen and water. As is the case with all other getters, the gettering of non-hydrogen species is limited to surface adsorption and reaction and is therefore more limited than the gettering of hydrogen which occurs by bulk absorption. Excessive surface reaction layers from non-hydrogen gases can limit the ability of any getter to absorb hydrogen; however, high temperature (100°-500° C.) reactivation treatment under vacuum or in the presence of inert gases can restore activity to hydrogen.

The invention will become clearer from the examples which follow, taken in conjunction with the drawings. It is to be understood that these examples and drawings illustrate preferred embodiments of the invention and are not to be regarded as limiting; since numerous deviations from these embodiments can be made without departing from the spirit of the invention.

In the drawings:

FIG. 1 contains three curves showing the effect of MM content on the room temperature, first hydrogen gettering (activation) of alloys containing about 59.3-61.2 wt. % Zr., 36.7-38.8 wt. % Ni, balance MM.

Figure 2:
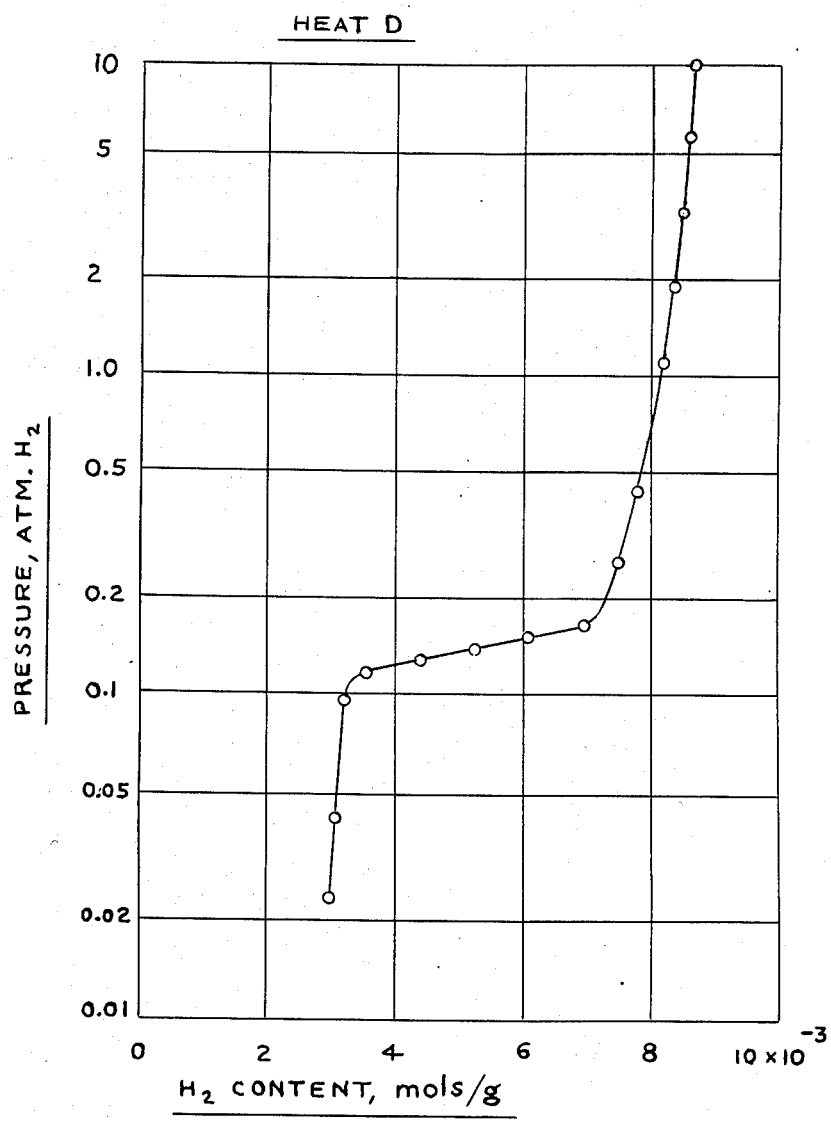

FIG. 2 contains a 232° C. hydrogen desorption isotherm of an alloy of composition approximately 59.8 wt. % Zr., 36.2 wt. % Ni, 4.0 wt. % MM made by air induction melting.

Figure 3:
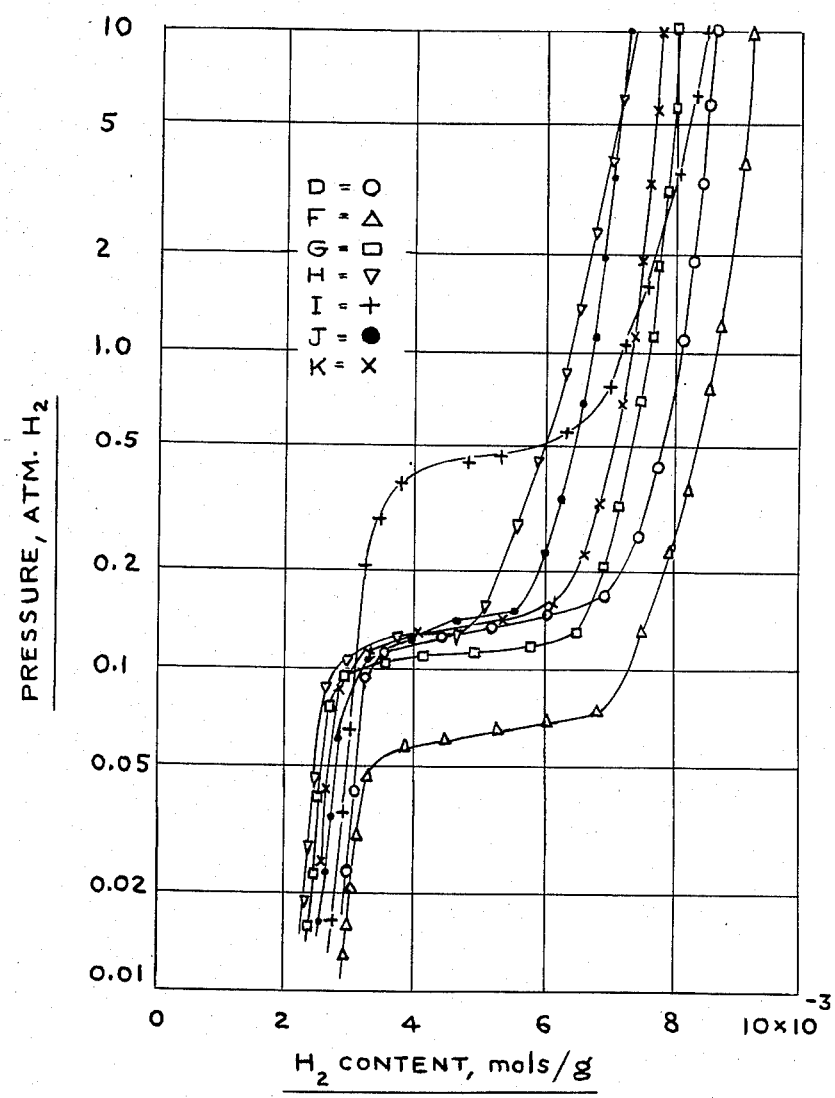

FIG. 3 contains a number of 232° C. hydrogen desorption isotherms for getter compositions based approximately on that of FIG. 2, but where partial substitutions of cobalt, copper, aluminum, tin, titanium, and silicon have been made for zirconium and/or nickel.

Figure 4:
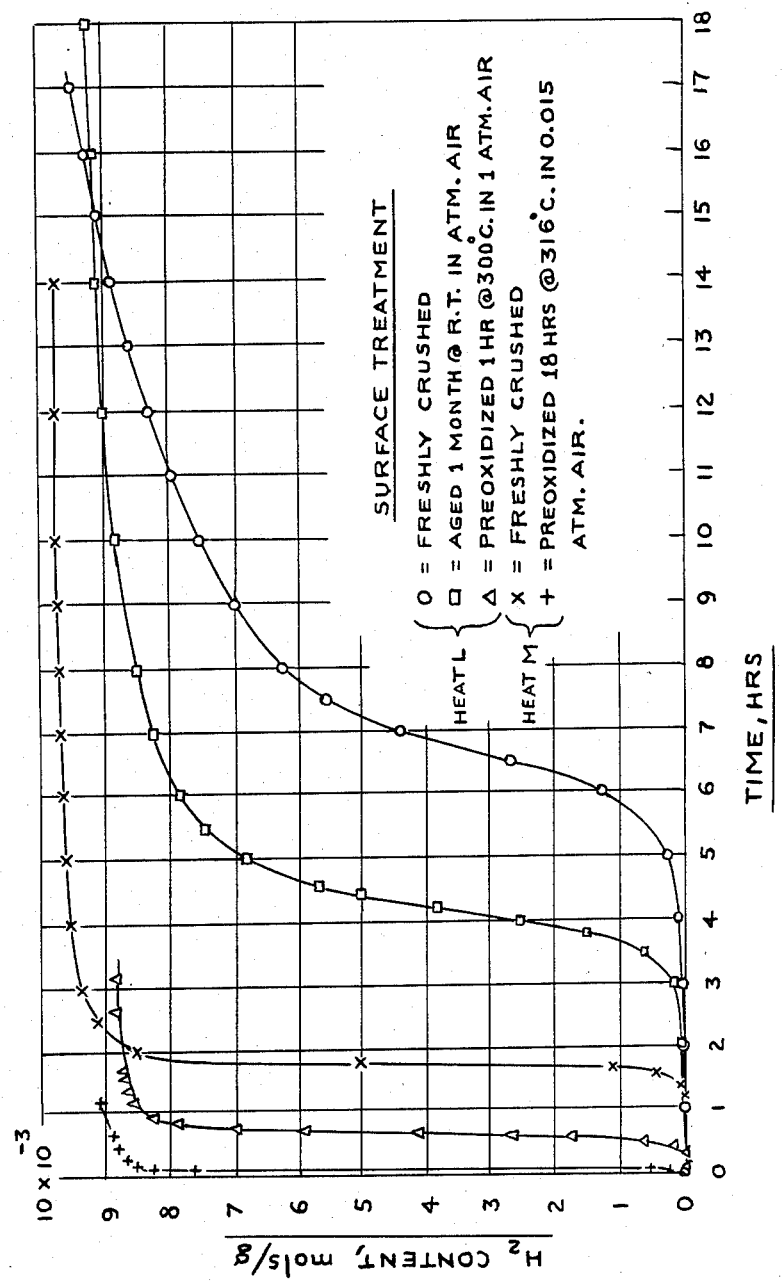

FIG. 4 contains a number of curves showing the effect of superficial surface oxidation on the room temperature, first $H_2$ gettering (activation) of the approximate alloy compositions 59.3 % Zr-36.7% Ni-4% MM and 59.8% Zr-36.2% Ni-4% MM, by weight.

EXAMPLE I

The following compositions were prepared by argon arc melting the metals Zr, Ni, and MM into 30 gram buttons:

|   | Wt. % | | |
|---|---|---|---|
|   | Zr | Ni | MM |
| A | 61.2 | 38.8 | 0.0 |
| B | 60.0 | 38.0 | 2.0 |
| C | 59.3 | 36.7 | 4.0 |

As can be seen the main variable was MM content. Eight gram samples were crushed in air to −12 mesh, +80 mesh granules and loaded into separate stainless steel reactors. Each reactor was then evacuated of air to a pressure of about 0.01 torr and backfilled to 0.68 atmosphere of 99.999 +% purity hydrogen. In series with each reactor was a reservoir of about 4 liters volume and a pressure transducer to measure pressure changes associated with activation and gettering. From the pressure changes and known reservoir volume, the sample hydrogen content would be calculated as a function of time. In all three cases the reactor was suspended in still, room temperature air. FIG. 1 shows, as a function of time, the hydrogen intake in terms of both mols/gram and atomic hydrogen/metal ratio. As can be seen, the sample without MM required more than 24 hours to reach hydrogen saturation. The ablity of MM to increase room temperature hydrogen gettering is very pronounced. For example, the sample with 4% MM required less than 0.5 hours to achieve saturation, thus demonstrating the basic utility of the invention.

EXAMPLE II

A charge of 580 kg (1280 pounds) of sponge zirconium, electrolytic nickel and ingot MM according to the charge composition (by wt.) 59.8% Zr-36.2 % Ni-4.0% MM was melted in air in a clay-graphite crucible and poured into 15 cm inside diameter cast-iron ingot molds (designated herein as Heat "D"). After solidification and cooling, a representative 8 gram sample was crushed to −12, +80 mesh granules and subjected to a room temperature activation identical to that described in Example I. The sample readily activated and absorbed hydrogen to a saturation value of 0.0095 mols/g within one hour. Following saturation most of the hydrogen was removed from the sample by heating to 232° C. (450° F.) and applying a vacuum of less than 0.5 torr. The sample was then resaturated to 10 atmospheres absolute hydrogen pressure at 232° C. Following resaturation, the 232° C. desorption isotherm shown in FIG. 2 was obtained with the low pressure offset measured by the final desorption of the sample to less than 1 torr hydrogen at 400° C. This diagram shows the basic 232° C. desorption pressures of the preferred alloy as well as graphically demonstrates that hydrogen saturated getters of the present invention can be processed for reuse. During hydride/dehydride cycling, of even only one complete cycle, getter surface area was increased by particle cracking so that subsequent hydrogen gettering at room temperature was extremely rapid and effective (see Examples III and IV).

EXAMPLE III

An 8 gram sample from Heat D was prepared in a manner similar to Example II including activation and bakeout to less than 1 torr at 400° C. The sample was then cooled under vacuum to room temperature. A volume of about 4 liters was then filled to about 1 torr hydrogen pressure and a valve opened to put that volume of low pressure hydrogen in communion with the specimen. Pressure was recorded as a function of time. Within 35 minutes, and operating at room temperature, the sample gettered the volume down to a pressure of less than 0.01 torr hydrogen.

EXAMPLE IV

An 8 kg heat (herein designated Heat E) of 58.8% Zr, 37.2% Ni, 4.0% MM, by weight, was prepared by air induction melting in a manner similar to Example II. Ten grams of sample were ground to −35 mesh and loaded into a flow-through type reactor. The sample was alternately hydrided at room temperature and dehydrided by heating and pumping for three cycles in a manner similar to that described earlier in Example II. During the third dehydriding cycle the sample was partially dehydrided to a pressure of 44 torr at 258° C., i.e. effectively just below the plateau such as was shown in FIG. 2. The sample was then cooled to 25° C. and held at 25° C. with a controlled-temperature water bath. At this point a mixture of helium and hydrogen containing 0.75 volume % hydrogen was prepared and 119.5 liters (STP) of this mixture passed through the sample at a pressure of 41 atmospheres and over a period of 1.5 hours with the objective of selectively gettering the hydrogen. After completing the passage of the mixture, the sample was again outgased to as near the initial conditions as possible (44 torr at 258° C.) and the gettered hydrogen collected. Within the precision of the measurements, the hydrogen recovered was at least 99% of that which entered the flow-through reactor in the helium-hydrogen mixture containing 0.75 volume % hydrogen. This indicated that the hydrogen content was gettered from a level of 0.75% to below 0.0075% in a single pass and demonstrates the ability of the subject invention to successfully getter an inert gas to low hydrogen levels at room temperature when in the activated form.

EXAMPLE V

The following alloys were prepared as 30 gram buttons by arc melting in an argon atmosphere.

| Heat ID | Wt. % | | | |
| --- | --- | --- | --- | --- |
| | Zr | Ni | MM | Other |
| F | 60.9 | 31.2 | 0 | 7.9 Co |
| G | 58.7 | 30.2 | 3 | 8.1 Cu |
| H | 60.3 | 35.0 | 3 | 1.7 Al |
| I | 50.2 | 40.3 | 3 | 6.5 Ti |
| J | 54.7 | 34.9 | 3 | 7.4 Sn |
| K | 58.2 | 37.0 | 3 | 1.8 Si |

Eight gram samples were crushed (−12, +80 mesh), activated at room temperature, dehydrided/rehydrided cycled once and charged to 10 atmosphere hydrogen pressure at 232° C. (450° F.). Desorption isotherms were obtained at 232° C. and are shown in FIG. 3. All of the alloys tested had useful gettering properties, demonstrating that numerous alloy substitutions are possible. Of particular interest is the partial substitution of titanium for zirconium (Heat I) which results in higher plateau pressures and the partial substitutions of cobalt and copper for nickel (Heats F and G, respectively) which lower the plateau pressure. This experiment demonstrates that the basic alloy system can be modified to match specific applications and getter properties with regard to pressure and/or temperature.

EXAMPLE VI

The following alloys were prepared in 5 kg batches by air induction melting:

| Heat I.D. | Weight % | | |
| --- | --- | --- | --- |
| | Zr | Ni | MM |
| L | 59.3 | 36.7 | 4 |
| M | 59.8 | 36.2 | 4 |

After crushing in air to −12, +30 mesh, samples were subjected to superficial surface oxidation treatments in air at air pressures ranging from 0.015 atm. abs. to 1 atm. abs. and temperatures ranging from room to 316° C. Eight gram samples were then subjected to room temperature hydrogen activation tests identical to those described in Example I. The results, shown graphically in FIG. 4, demonstrate that surface treatment (even long-time exposure at room temperature) enhances hydrogen gettering activity as evidenced by the shorter times required for hydrogen saturation for the treated samples shown in FIG. 4.

From the preceeding discussion and examples, it can be seen that alloys based on the system zirconium-nickel-mischmetal can be effective hydrogen getters even at room temperature without high temperature activation. It has also been clearly demonstrated the alloys, once saturated with hydrogen, can be regenerated and reused if desirable. Numerous alloy modifications and substitutions of the preferred composition have been shown to be possible. The alloy system can be prepared by conventional and economical air melting, which is not the case for most other reactive metal getter alloys. Finally, gettering activity can be greatly enhanced by superficial surface oxidation treatments.

I claim:

1. A getter composition for the removal of hydrogen and other gases, which contains in percent by weight: nickel—from about 20% to about 45%, one or more rare earth metals—from about 0.1% to about 10%, a metal selected from the group consisting of cobalt, copper, iron, aluminum, tin, titanium, silicon, and mixtures thereof—from about 0% to about 15%, and zirconium q.s. 100%.

2. A getter composition according to claim 1 wherein the percent by weight of nickel is from about 20% to about 40%, one or more rare earth metals is from about 0.1% to about 6%, and zirconium q.s. 100%.

3. A getter composition according to claim 2 wherein the rare earth metals are present as a mischmetal containing in percent by weight:
   cerium—from about 48% to about 50%,
   lanthanum—from about 32% to about 34%,
   neodymium—from about 13% to about 14%,
   praseodymium—from about 4% to 5%, and
   other rare earth metals—about 1.5%.

4. A getter composition according to claim 3 containing in percent by weight:
   nickel—36%,
   mischmetal—4%, and
   zirconium—60%.

5. Getter composition according to claim 3, containing in percent by weight:
   nickel—30%,
   mischmetal—3%,
   cobalt—8%, and
   zirconium—59%.

6. A getter composition according to claim 3, containing in percent by weight:
   nickel—40%,
   mischmetal—3%
   titanium—6.5% and
   zirconium—50.5%.

7. A getter composition of claim 1 that is crushed and subjected to a superficial surface oxidation procedure consisting of exposing to air or any oxidizing environment at any temperature up to 400° C.

8. A getter composition of claim 1 that is prepared by melting elemental components under air in a clay-graphite crucible usng an induction furnace.

9. A getter composition of claim 1 that is prepared by melting elemental components under vacuum or inert gas in a graphite crucible using an induction furnace.

10. A getter composition of claim 1 that is prepared by melting elemental components under vacuum or inert gas in a water-cooled metal crucible using an arc furnace.

* * * * *